United States Patent [19]

Krangle

[11] Patent Number: 5,046,839

[45] Date of Patent: Sep. 10, 1991

[54] GOLF COURSE RANGE FINDER SYSTEM

[75] Inventor: Robert S. Krangle, Rio Rancho, N. Mex.

[73] Assignee: Locker Enterprises, Inc., Minneapolis, Minn.

[21] Appl. No.: 559,906

[22] Filed: Jul. 30, 1990

[51] Int. Cl.⁵ .................. G01C 3/08; A63B 55/00
[52] U.S. Cl. ................... 356/5; 273/32 R; 273/33 B; 273/32 H
[58] Field of Search ............... 273/32 R, 32 B, 32 H; 356/5

[56] References Cited

U.S. PATENT DOCUMENTS

| | | |
|---|---|---|
| 3,053,134 | 9/1962 | Bjornson .................. 356/5 |
| 3,680,958 | 8/1972 | Von Bose ................. 356/5 |
| 3,868,692 | 2/1975 | Woodard et al. . |
| 4,088,324 | 5/1978 | Farmer . |
| 4,136,394 | 1/1979 | Jones et al. . |
| 4,308,537 | 12/1981 | Berry et al. ............. 356/5 |
| 4,419,655 | 12/1983 | May . |
| 4,518,255 | 5/1985 | Zuleeg ..................... 356/5 |
| 4,666,157 | 5/1987 | Bodine et al. . |
| 4,675,816 | 6/1987 | Brandon et al. . |
| 4,698,781 | 10/1987 | Cockerell, Jr. . |
| 4,703,444 | 10/1987 | Storms, Jr. et al. . |
| 4,730,190 | 3/1988 | Win et al. ................. 356/5 |

OTHER PUBLICATIONS

RCAN AN/GUS-5, RCA Gov't and Commerical Systems ad, Aug. 30, 1976, 356-5.

Primary Examiner—Stephen C. Buczinski
Attorney, Agent, or Firm—Merchant, Gould, Smith, Edell, Welter & Schmidt

[57] ABSTRACT

A hand-held electro/optical range finder, sends discrete pulses of coherent light to a retroreflector which is mounted on a golf course pin. The time period required for the light pulses to traverse the distance between the golfer and the pin is converted into a distance measurement which is displayed to the golfer.

10 Claims, 7 Drawing Sheets

GOLF COURSE RANGE FINDER SYSTEM

FIELD OF THE INVENTION

The present invention relates to a range finding apparatus for use by a golfer for determining distance on a golf course. More particularly, the golfer aims a hand-held optical transceiver at a pin located on a golf course green, and the device displays the distance between the golfer and the pin.

BACKGROUND OF THE INVENTION

As is known in the art, a golfer may determine the remaining distance to the pin by referring to permanent distance markers set out along the fairway. However, these yardage markers are generally set at 50 or 100 yard increments, requiring the golfer to interpolate or estimate his exact location. Additionally, fixed yardage markers do not account for variations in pin placement on the green, which can alter the actual distance by as much as 25 yards.

A variety of attempts have been made to provide golfers with a more accurate indication of the remaining distance to the pin. Such efforts have included the use of radio transceivers. For example, U.S. Pat. No. 3,868,692 to Woodard et al. discloses a plurality of transmitters located on the greens. Each transmitter is designed to generate an RF signal of a different frequency. The golfer uses a receiver unit that displays the relative distance to each of the transmitters.

A similar system is disclosed in U.S. Pat. No. 4,136,394 to Jones et al. which teaches a system which includes a base unit mounted at or near the pin on the green and a number of remote units carried by the golfers on the course The remote units transmit rad pulses to the base unit, and the base unit responds by returning an acoustic or ultrasonic signal. The time interval between transmission of the radio pulse and the reception of the acoustic signal defines the distance to the pin. The distance is displayed by means of a readout on the remote unit.

U.S. Pat. No. 4,698,781 to Cockerell and U.S. Pat. No. 4,703,444 to Storms et al. both describe systems wherein remote stations are located on the golf course. A signal emitted by the golfer's portable unit is received by all three remote stations. The golfer's current position on the course is triangulated and transferred to a central CPU.

The central CPU stores the location of various predetermined features on the course. The CPU calculates the distance from the golfer's current position to the specified feature and relays the distance to the golfer's portable unit, where it is displayed by use of a digital readout.

Yet another approach is set forth in U.S. Pat. No. 4,088,324 to Farmer. This patent teaches the utilization of an acceleration sensor mounted in the golf club head for detecting the deceleration shock pulse generated by striking the ball. Electronic circuits mounted in the club handle convert the analog signal from the acceleration sensor to a digital signal proportional to the distance traveled by the ball and transmits the distance to a digital display mounted on the end of the club. The golfer can estimate the current or present position by subtracting the distance the ball traveled from the total length of the hole.

SUMMARY OF THE INVENTION

In contrast to the prior art, the present invention provides a convenient and accurate apparatus for measuring the distance to the pin on a golf green.

The invention includes a hand-held electro/optical TDR (Time Domain Reflectometry) transceiver that cooperates with a pin mounted passive retroreflector to measure distance on the golf course.

The transceiver sends pulses of light to the passive retroreflector attached to the pin. Light which travels from the optical transmitter section of the transceiver to the retroreflector on the pin is reflected back to the optical receiver section of the hand-held unit.

The transmitted pulse train and the received pulse train differ in edge synchronicity. This difference in edge position is proportional to the transit time of the transmitted optical signal. A timing device responsive to edge position operates to measure the transit time for the signal. This measured time difference is displayed as a distance measurement. The hand-held unit includes a digital readout which is used to display the distance measurement to the golfer.

These and other objects, features and advantages of the invention will become apparent upon reading the following detailed specifications and drawings.

DETAILED DESCRIPTION OF THE PREFERRED EMBODIMENT

Although the present invention is described in connection with a preferred and illustrative embodiment of the invention, it should be appreciated that other embodiments or variation of the invention are contemplated within the scope of this invention.

Overview

Figure 1:
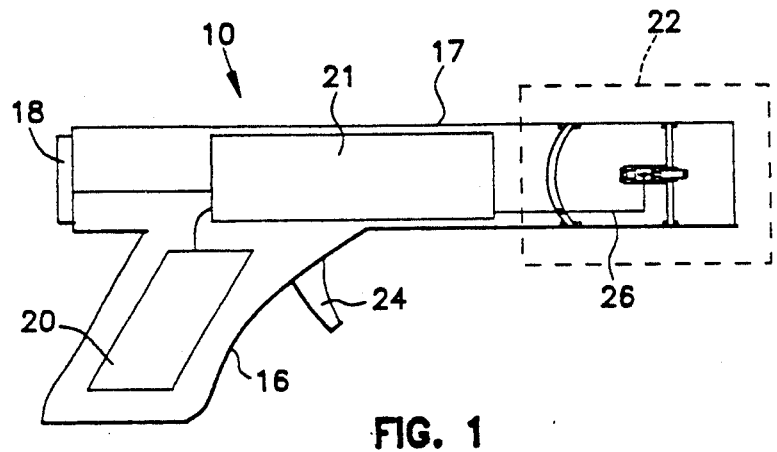
FIG. 1 is a diagram showing the mechanical layout of the hand-held optical transceiver.

FIG. 1 shows the hand-held "pistol-shaped" transceiver 10 in isolation. This phantom view of the transceiver shows that the interior of the handle 16 holds a battery module 20. The body 17 contains an electronics module 21. The "barrel" portion of the body 17 locates an optical system 22. The rear of the body 17 carries an alphanumeric display 18 for displaying distance measurements to the user 12.

Figure 5:
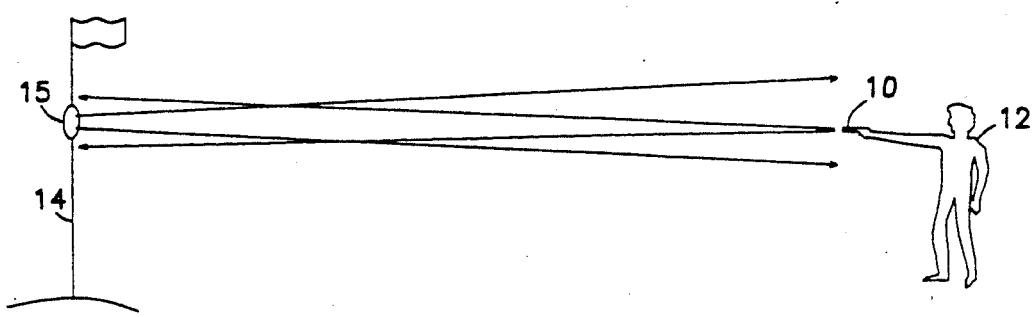
FIG. 5 is a drawing depicting a user utilizing the hand-held optical transceiver in conjunction with a flag pin mounted retroreflector.

FIG. 5 shows the system in use. In that figure the golfer or user 12 is directing or aiming the transceiver 10 toward a pin 14 located some distance away down the fairway.

The transceiver includes both transmitting and receiving sections. In use, the transmitter section sends out an optical signal to the retroreflector 15 mounted on the pin 14.

The retroreflector 15 collects and redirects the optical signals to the receiver section of the transceiver 10. The time difference between the edges of the transmitted and received signals are compared to determine the time of flight for the optical signal.

The transceiver contains computation and display circuitry which automatically converts signal edge information into a distance measurement which is displayed to the golfer 12.

System Level Description

Figure 6:
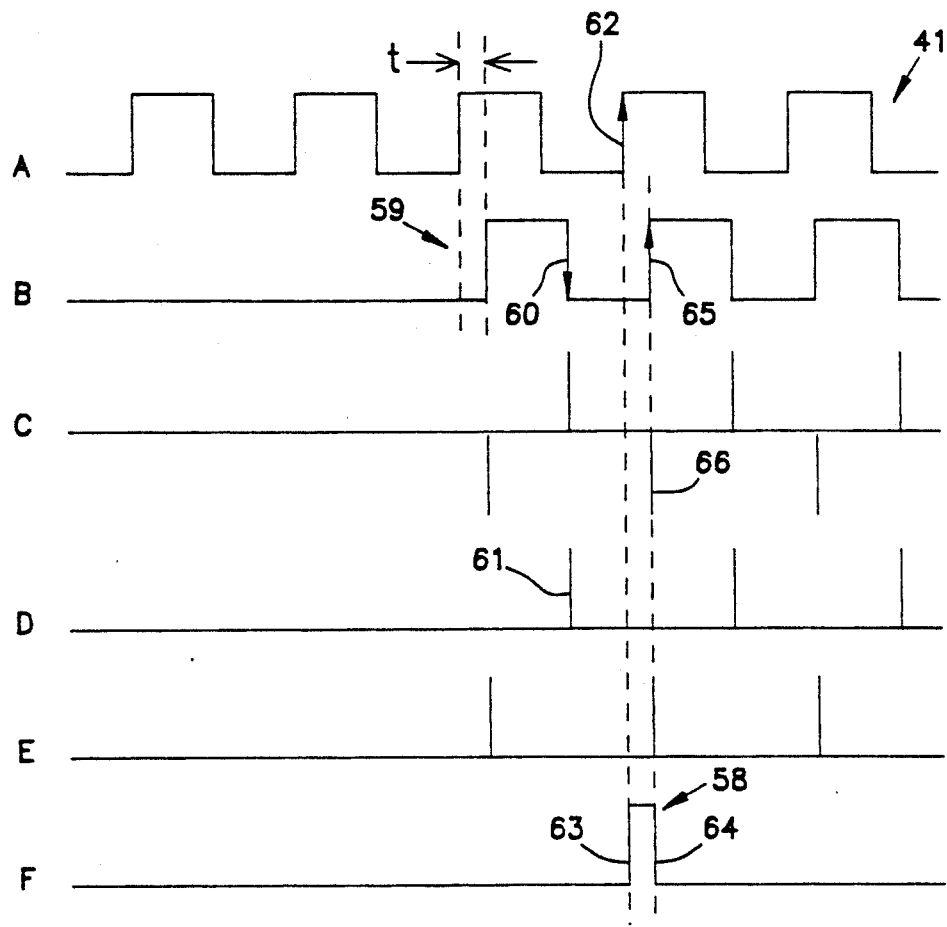
FIG. 6 is a timing diagram depicting the signal and control waveforms of the electronic portion of the measurement system.
Figure 7:
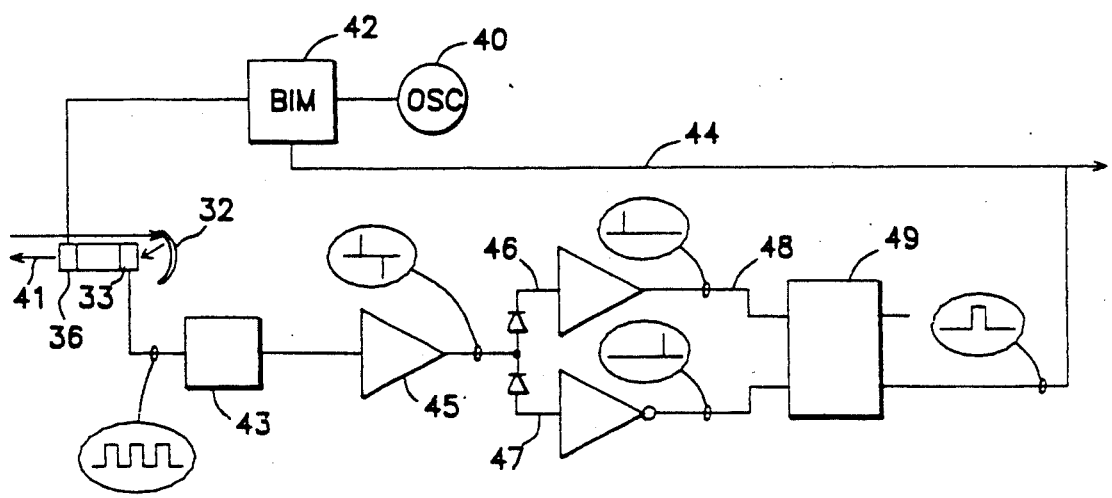
FIG. 7 is a conceptualized functional diagram describing the basic operation aspects of the electronic portion of the transceiver.

10 The wave form diagram set forth in FIG. 6, and the conceptualized schematic of FIG. 7 describe the basic operational aspects of the invention.

In operation, the transmitter section is activated by the user through a trigger 24. The transmitter section generates and emits a pulsed wave train of coherent light. Panel A of FIG. 6 depicts the square wave waveform of this transmitted signal. The preferred repetition rate is 10 KHz which insures that the waveform period is twice the longest time interval to be measured by the system. At this repetition rate, the period is still short enough that user motion is not capable of interfering with the measurement.

When this wave train depicted in panel A, falls on the retroreflector, the retroreflector returns some of the light energy to the receiver section of the transceiver.

The receiver section generates a detected signal when the incident light energy rises above a threshold. The received waveform signal developed in the front end of the receiver section is depicted in panel B of FIG. 6 (panel A).

In general, the transmitted waveform and the received waveform (panel B) differ only in terms of edge synchronicity which is displayed in the diagram of FIG. 6 as the time difference between transmitted and received signals "t". This time difference is linearly proportional to the distance between the transceiver and the retroreflector, and results from the transit time of the optical signal to the retroreflector and back.

Receiver circuitry differentiates the detected waveform of panel B to generate the waveform depicted in panel C of FIG. 6. The negative going and positive going edges of the differentiated waveform are used to generate control signals, depicted in panels D and E of FIG. 6. These control signals indicate the edge position in the received waveform. The first negative going edge 60 of the received waveform corresponds to and generates the "target acquisition pulse" 61. This control signal 61 is used to initialize and invoke an automated measurement system.

Once the system is initialized in this fashion, a conversion counter accumulates counts during a count window 58. This counting operation converts the time interval measurement into a distance measurement for display to the golfer. In the example of FIG. 6, the next leading edge 62 of the transmitted waveform is used to start the conversion counter. This event corresponds to the "start count" signal 63. The conversion counter accumulates counts at a fixed rate for a count window extending from the "start count" signal 63 to the leading edge 65 of the next returned waveform shown in FIG. 6, panel F, as edge 64. This "stop count" signal 60 corresponds to the leading edge 65 of the next received pulse.

During the count window defined by edges 63 and 64, counts from a 160 MHz clock are collected in the conversion counter. The oscillator clock frequency is scaled, to directly convert the time delay into a display of the measured distance in yards.

The receiver section also shuts off the transmitter to reduce battery consumption at the conclusion of the measurement cycle; however, this feature is not depicted in the waveforms displayed in FIG. 6.

In summary, the activation of the trigger 24 results in the transmission of the light pulses. Once the target has been acquired the transit time measurement is made automatically and the transmit laser is shut off.

Structural elements for generating the control functions set forth in FIG. 6 are set forth in FIG. 7. As shown in that figure, a stable free-running multivibrator oscillator 40 is used to supply an approximately 10 KHz clock rate to establish the transmit repetition rate for the laser diode 36. Beam interrupt modulation circuitry 42 is provided to pulse modulate the transmitted beam. The preferred duty cycle is 50%. The modulator 42 drives the transmitter diode 36 to generate the transmitted optical signal 41.

The receiver portion of the system includes an optical sensor 33 for converting incident radiation into electrical energy. The sensor 33 is coupled to buffer circuitry 43 for the impedance transformation and recovery of the received signal.

The received signal is differentiated to extract the leading and trailing edges of the received waveform. The differentiation process is performed in association with amplifier function 45.

The leading and trailing edge signals are extracted from the differentiated signal, by positive 46 and negative 47 pulse strippers. The edge signals are converted to logic level control signals.

After being latched by a suitable flip flop 49, the target acquisition pulse signal is used to reset the display counters to initialize them, this signal is also used to interrupt the transmitted optical signal via connection 44.

Optical System

Figure 2:
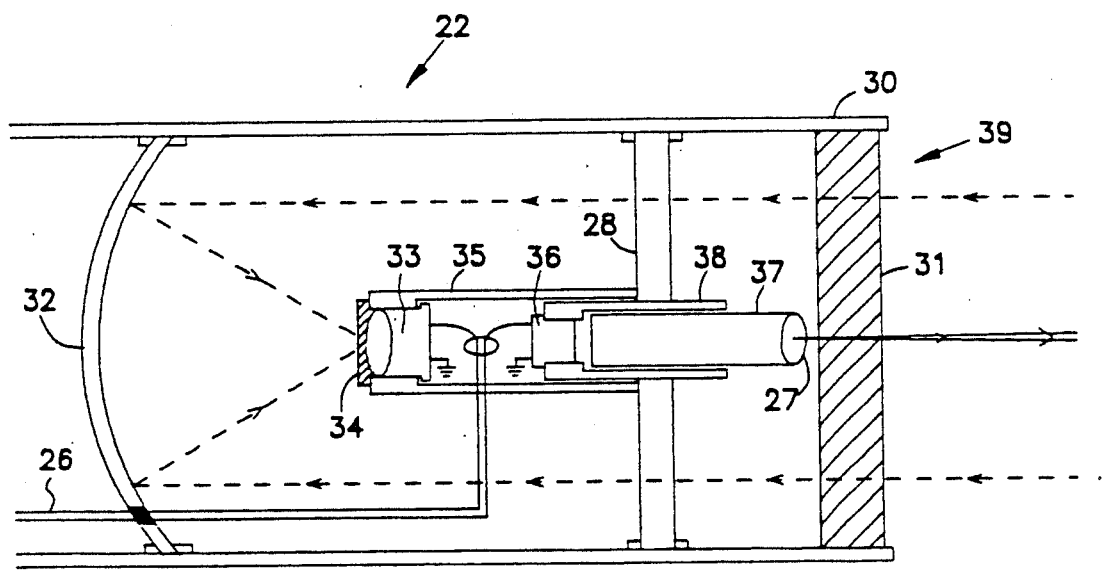
FIG. 2 is a detailed mechanical diagram of the optical telescope portion of the transceiver shown in FIG. 1.
Figure 3:
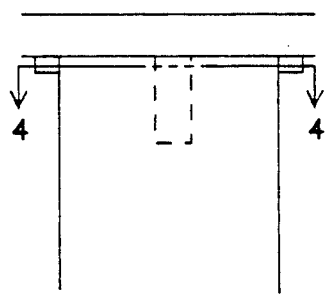
FIG. 3 is a sectional view drawing of the preferred embodiment mounting mechanism shown in FIG. 4.
Figure 4:
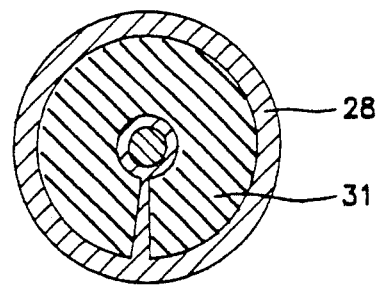
FIG. 4 is a diagram of the preferred mounting structure for locating the optical transmitter and receiver elements within the telescope portion of the transceiver.

The optical system 22 is depicted in isolation in FIG. 2. It is preferred to utilize a telescopic optical system to collect light for the receive function of the transceiver. As shown in FIG. 2, a tubular member 30 having an aperture of approximately two inches is provided to collect light. Near the front of this tubular member 30 is a receiver collimator 31 which is preferably between 0.5 and 1.0 inches thick. In operation, the collimator is sized to eliminate the collection of off axis radiation. It is preferred to limit the telescope to a field of view of approximately 3 degrees or less.

The rear of the telescope contains a mirror 32 for collecting and directing the collimated light onto the sensor 33. It is preferred, but not required to provide narrow band optical filter 34 for the collected light. The inclusion of the filter improves the signal to noise ratio for the received light signal. The optical to electrical transducer or sensor 33 is preferably an FFD-100 photodetector sensor manufacture by EG&G Corp. This photodiode detector has sufficient conversion efficiency, sensitivity and frequency response (electrical rise time) for this application.

It is preferred to support 28 the receiver diode in a housing 35 which is concentric with the tubular housing 30, and coaxial with the transmit diode 38 mount.

The preferred output diode is an LDM 22 laser diode manufactured by Sharp Corp. The output from this laser diode is collimated by the transmitter collimator tube 37 and collimator lens 27 which restricts the illumination beam to a divergence of 0.05 milliradians or a divergence of 1 foot per 100 yards.

Suitable electrical conductors 26 are provided to couple the receiver sensor 33 and transmitter laser devices 36 to the electronic module 21.

Electronic Module

The schematic diagrams of FIGS. 8, 9, 10, 11 and 12 set forth the device types and circuit values for the preferred and illustrative embodiment of the transceiver.

The system relies in part on the detection of sharp signal edges. These waveform features have very sharp rise times and are rich in high frequency components which require wide bandwidth, high speed components. For this reason various logic and device families are represented in the schematics. The wide bandwidth and high gain factors require careful component layout and power supply isolation to insure reliable and stable operation of the overall system.

Figure 8:
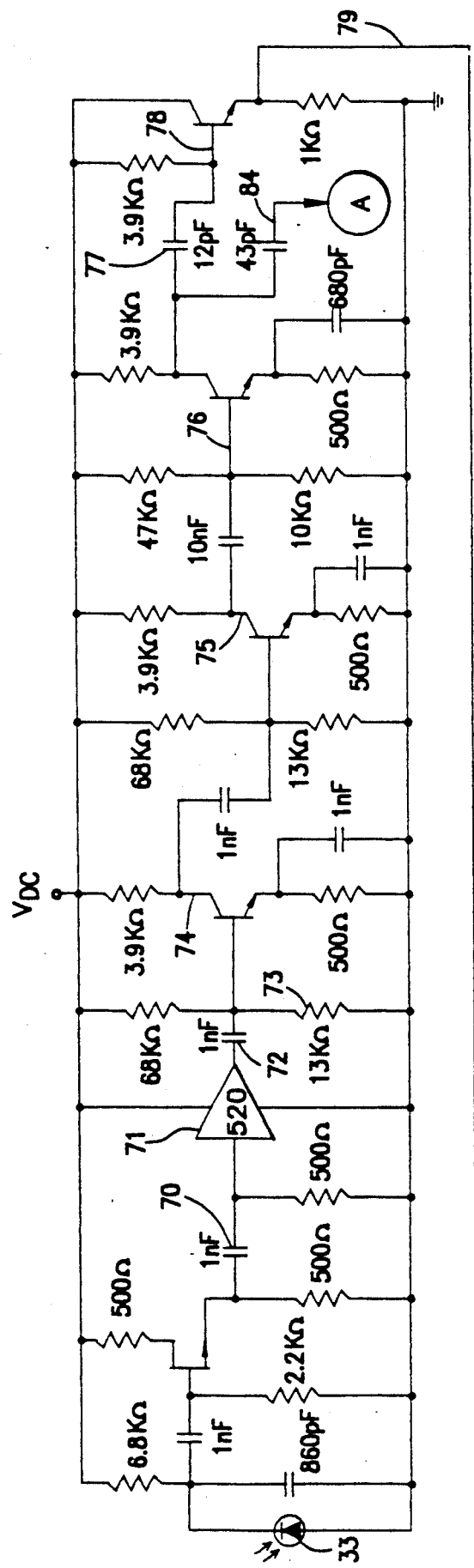
FIGS. 8, 9, 10, 11, and 12 are collectively the electrical schematic diagram depicting an illustrative embodiment of the transceiver.
Figure 8:
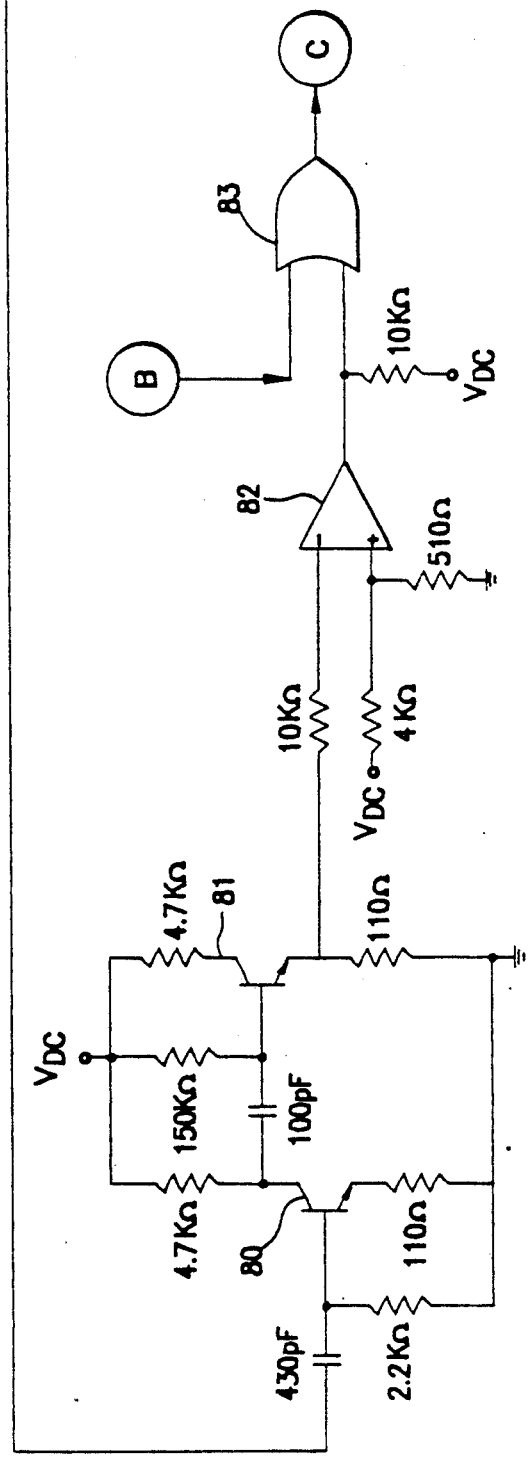

The upper portion of FIG. 8 is the photodiode receiver detector section or front end of the transceiver. The photodiode sensor 33 output is coupled to an FET amplifying stage which performs an impedance transformation and buffering function. At this stage of the receiver the detected signal is loosely coupled through the small value capacitor 70 to another gain stage represented by operational amplifier 71. The operational amplifier output is differentiated through the capacitor resistor network formed by capacitor 72 and resistor 73. The differentiated signal is amplified by several stages of amplification implemented with transistors 74, 75 and 76. The amplified and differentiated signal is capacitively 77 coupled to a transistor 78 which is biased toward the upper supply rail. The emitter connection generates a signal when the base connection is presented with a positive going pulse. After suitable logic buffering associated with transistors 80 and 81 and the comparator 82, the positive stripped pulse is coupled to OR gate 83 for use as a control signal.

Figure 9:
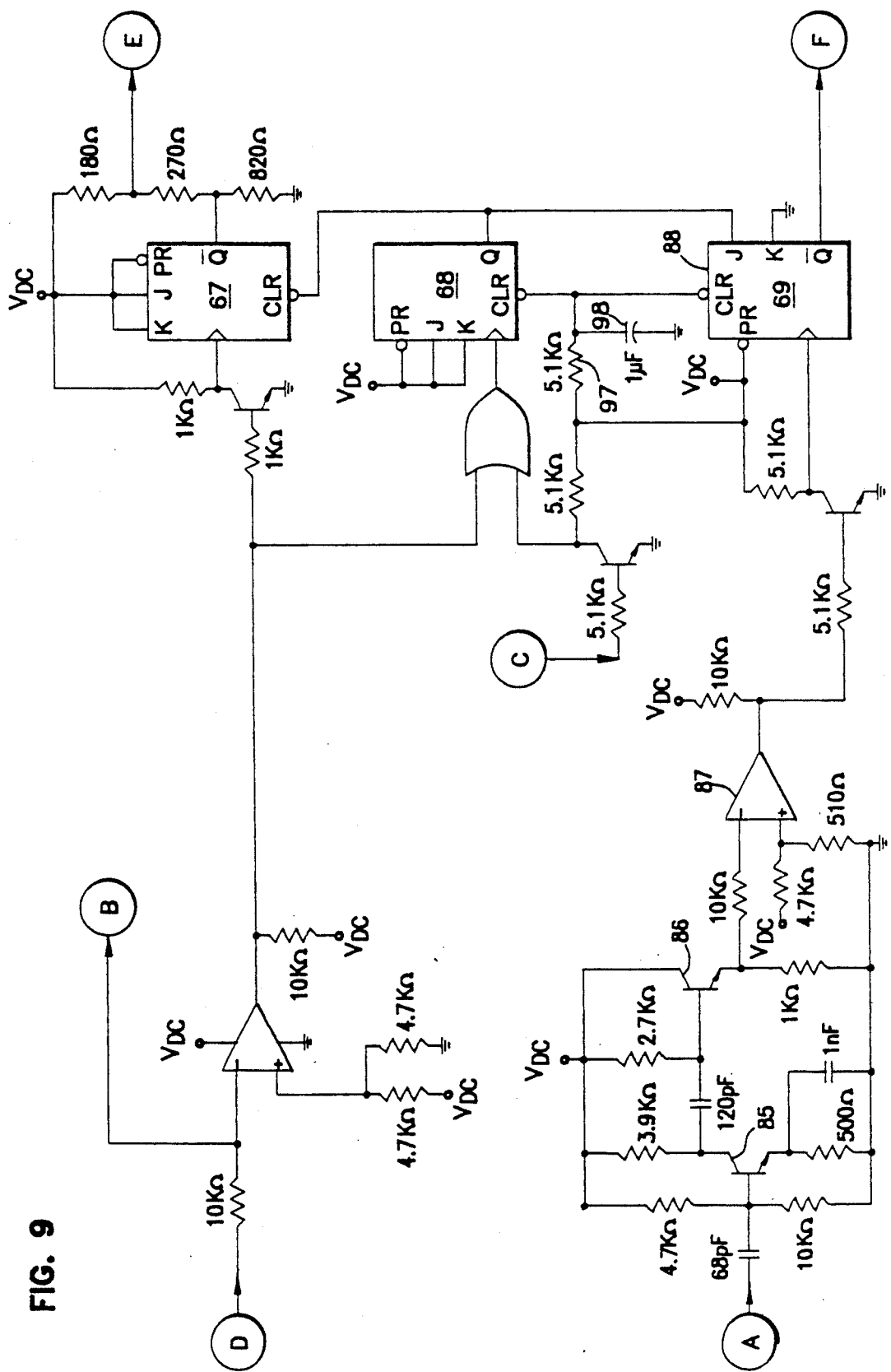

In a similar fashion, the amplified and differentiated signal is capacitively coupled through capacitor 84 to a negative pulse stripper shown on FIG. 9 in connection with transistors 85 and 86 and comparator 87. This logic level signal is used for control functions and is applied to flip flop (FF) 88.

Figure 10:
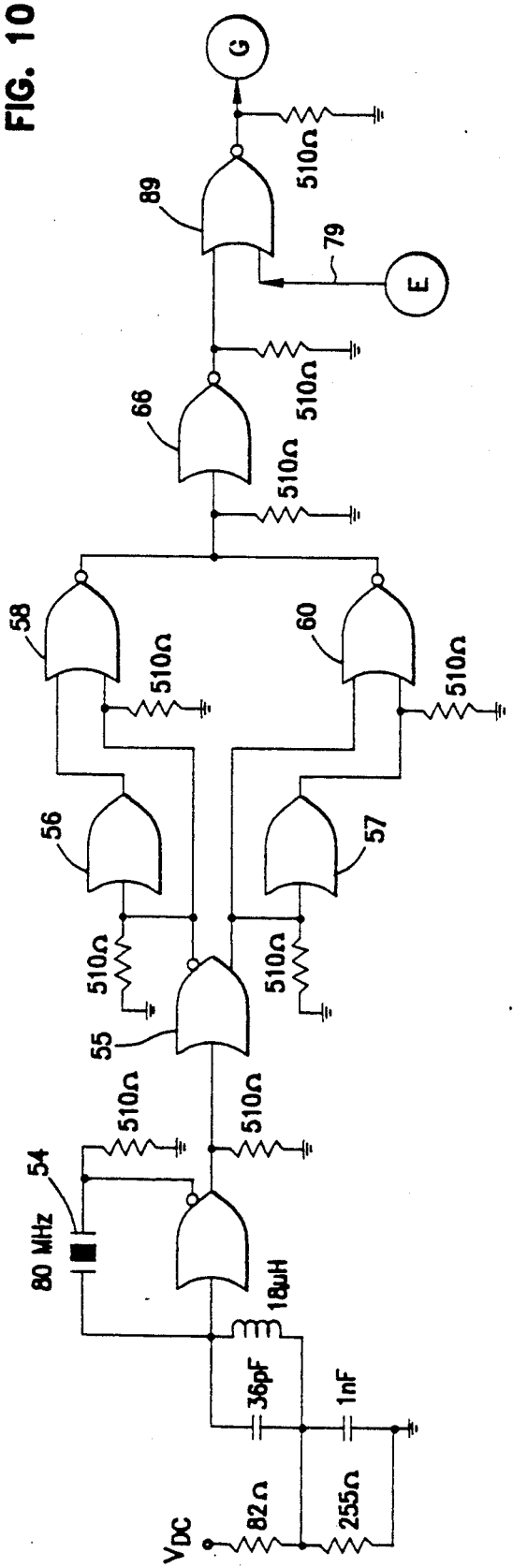
Figure 11:
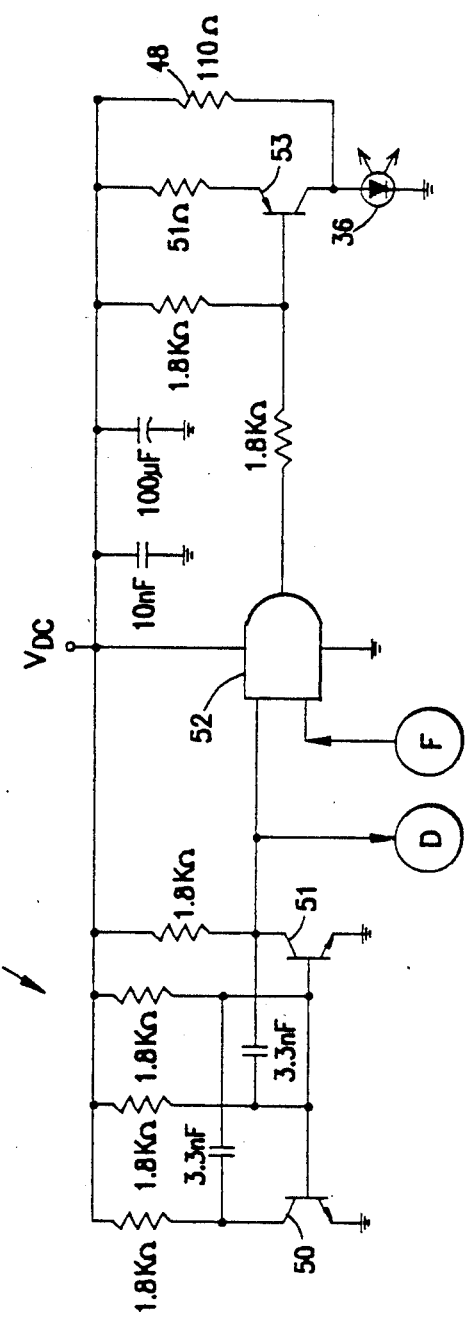

Turning to FIG. 10, there is shown a 160 MHz oscillator. The 80 MHz crystal frequency is doubled by the collection of OR and inverters as set forth in the figure. the clock output from the "clock gate" NOR 89 is used to clock the counter 90 shown on FIG. 11. The clock pulses are turned "off" through input 79 to the NOR gate 89. In operation, the "stop count" signal is applied to this input of NOR 89 to complete the time to distance conversion.

Figure 12:
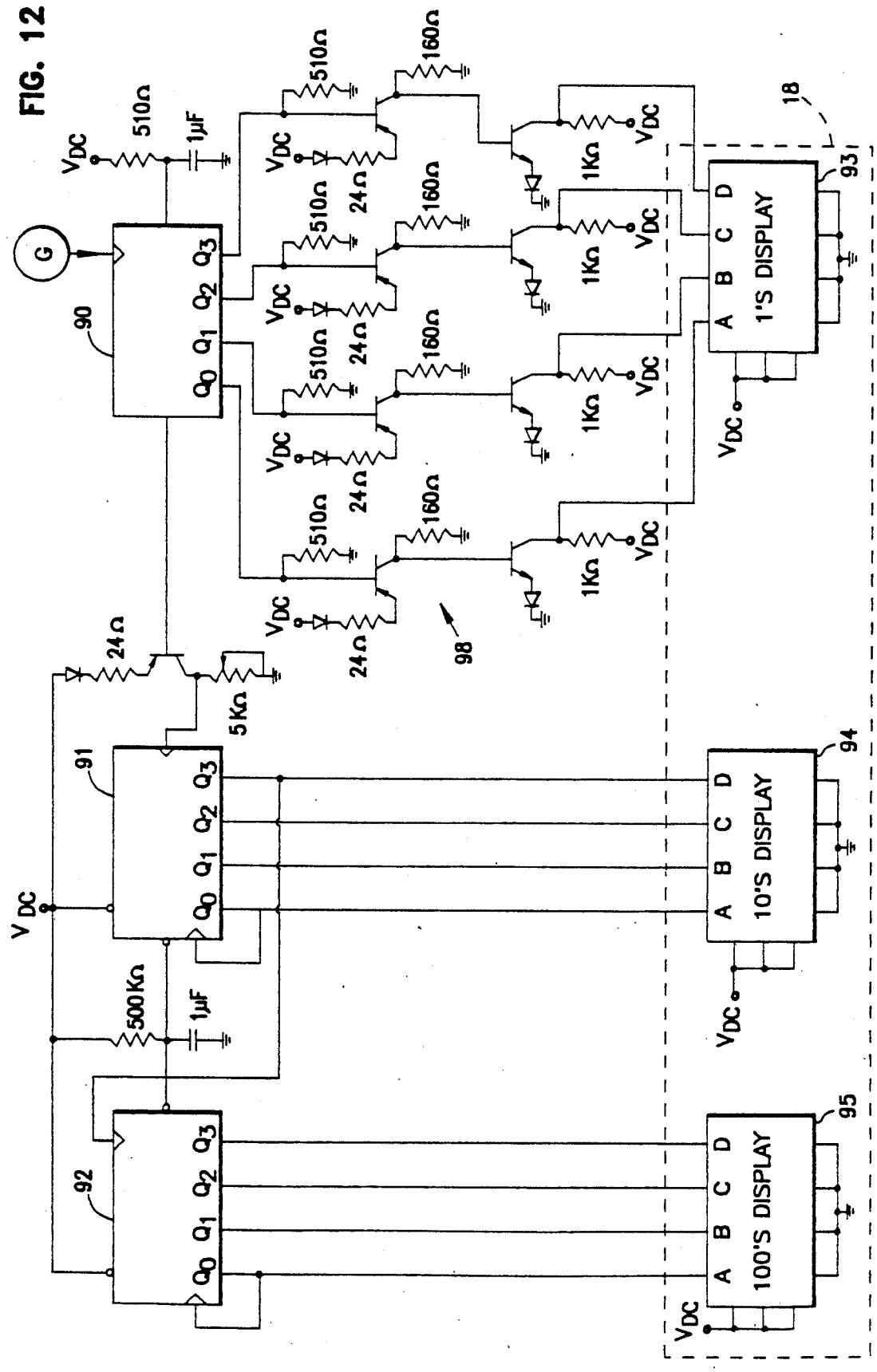

Turning to FIG. 12, the counter circuitry for conversion of the time difference information into a yardage display is shown. Cascaded counters 90, 91 and 92 count clock pulses supplied to input G of counter 90. In operation, the counter 90 accumulates the "1's" counts while every tenth count overflows to clock the next counter stage 91 which collects the "10's" count. In a similar fashion, the overflow of counter 91 clocks counter 92 to collect the "100's" count. Three decades of integrated display drivers are provided as 93, 94, and 95. These devices collectively form the display 18. Resistor 96 and capacitor 97 form a power on reset for the counters. The transistor array generally designated 98 provides the appropriate interface between the high speed counter 90 and the "1's" display.

FIG. 9 shows the control logic for the system. Flip flop 69 is referred to as the "stop count" flip flop. The output labeled F in the figure is supplied to AND gate 52 of the beam interrupt modulator shown in FIG. 11. This flip flop turns the laser diode 36 off at the conclusion of the measurement cycle.

Flip flop 68 is referred to as the "target acquired" flip flop. This flip flop is toggled by the processed signal from the sensor 33. The state of this flip flop indicates that the receiver has been activated b a signal returned from the retroreflector 15 and that a time difference measurement can be made.

Flip flop 67 is referred to as the 10 Kc laser oscillator flip flop. This flip flop controls clock gate 89 and effectively controls the application of clocking pulses to the counter 90.

In general, these flip flops have their preset pins coupled to the positive power supply while a simple resistor 97 and capacitor 98 timer supplies a reset signal to the devices to initialize them.

Upon power up, the 10 KHz laser oscillator flip flop 67 is held in a reset state which blocks clock pulses at the clock gate 89. At this time, the power up reset of the target acquisition flip flop 68 "clears" the stop count flip flop 69 which generates the "laser off" signal F which insures that the laser is held off.

This sequence of events prepares the counters for a measurement cycle. When the receiver first receives the first returned pulse of light from the retroreflector, the target acquired flip flop 68 toggles to the set state which takes the rest off the 10 KHz oscillator flip flop 67 and enables the stop count flip flop 69 by placing a logic one at its J input. The next rising edge 62 of the 10 Kc oscillator flip flop is toggled which opens the clock gate 89 starting the counter accumulator function. The next received edge 65 from the sensor toggles t e stop count flip flop 69 which clears the 10 KHz laser oscillator flip flop closing the clock gate flip flop 89, which completes the measurement.

What is claimed is:

1. Apparatus for measuring the distance between a golfer and a pin located on a golf course, comprising:
    (a) an optical retroreflector mounted on said pin;
    (b) a transceiver adapted for operation by said golfer, the transceiver further comprising:
        (i) a hand holdable pistol shaped housing, the housing being formed so as to have a body portion, a handle portion and a barrel portion;
        (ii) optical transmitter means for generating optical pulses at a first repetition rate and for sending said optical pulses to said retroreflector, the optical transmitter further comprising an electronics module and an optical system, the electronics module residing in the body portion of the housing and the optical system residing in the barrel portion of the housing;

(iii) optical receiver means for receiving and detecting optical pulses reflected from said retroreflector, and for generating a detected pulse signal indicative of said optical pulses, the optical receiver means residing with the optical transmitter means; and (iv) timing means for measuring the time difference between the leading edge of one said transmitted optical pulses and the corresponding leading edge of said corresponding detected pulse signal, the timing means further comprising:

(A) a trigger, the trigger residing in the handle portion of the housing, operation of the trigger causing the optical transmitter means to generate and emit a pulsed wave train of coherent light, thereby creating a square waveform having a plurality of leading and trailing edges; and (B) a differentiator, the differentiator generating a plurality of control signals indicative of each edge position of the plurality of leading and trailing edges of the square waveform, the differentiator generating the control signals in response to the detected pulsed signal generated by the optical receiver means, thereby permitting the distance measurement to be accomplished by recording a time period between the leading edge of the emitted pulsed wave and the control signal generated in response to detection of the same leading edge of the reflected signal.

2. The apparatus of claim 1 wherein said transceiver further comprises:
telescope means for collecting and focusing incident light onto said sensor.

3. The apparatus of claim 2 wherein said telescope further comprises:
a optical system including a circular crossection tube having a front end and a back end,
a mirror located within said tube at said back end for collecting and directing incident light to a focus,
sensor support means located at said focus for retaining and locating said sensor.

4. The apparatus of claim 3 wherein said optical system further comprises:
transmitter diode support means, concentric with said sensor support means for locating a transmitter diode proximate said front end.

5. The apparatus of claim 3 wherein said optical system further comprises:
collimator means located within said tube proximate said front end for reducing the acceptance of off axis to three degrees or less.

6. The apparatus of claim 1 wherein said optical transmitter comprises:
oscillator means for generating pulses at a first repetition rate;
transmitter diode means for converting electrical energy into optical pulses;
buffer driver means coupled to said oscillator means and coupled to said transmitter diode means for driving said diode at said first repetition rate.

7. The apparatus of claim 1 wherein said optical receiver comprises:
sensor means for converting incident optical pulses into an received electrical signal;
signal processing means for amplifying and differentiating said received electrical signal and for generating logic control signals indicative of the edges of said optical pulses.

8. The apparatus of claim 1 wherein said timming means comprises:
logic means for defining a timing window, said timing window extending from the leading edge of one of said transmitted optical pulses to the corresponding receiver detected leading edge of the returned optical pulse,
counter means coupled to said logic means for accumulating pulses during said timing window and for generating an accumulated count,
display means for displaying said accumulated count as a distance measurement to said golfer.

9. The apparatus of claim 8 further comprising:
switch means coupled to said optical transmitter means to permit activation of said optical transmitter means to initiate a distance measurement.

10. The apparatus of claim 1 or claim 4 further including an optical band pass filter located proximate said optical receiver for limiting light contribution by light which is not of the same wave length as the transmitted pulses. -

* * * * *

UNITED STATES PATENT AND TRADEMARK OFFICE
CERTIFICATE OF CORRECTION

PATENT NO. : 5,046,839

DATED : September 10, 1991

INVENTOR(S) : Robert S. Krangle

It is certified that error appears in the above-identified patent and that said Letters Patent is hereby corrected as shown below:

Column 1, line 36, after "course" insert a period.

Column 1, line 36, for "rad" read --radio--.
Column 3, line 20, delete "10" before "The".
Column 4, line 39, for "." read --,--.
Column 4, line 67, for "manufacture" read --manufactured--.
Column 5, line 59, for "the" read --The--.
Column 6, line 21, for "b" read --by--.
Column 6, line 48, for "t e" read --the--.
Column 7, line 40, for "crossection" read --cross-section--.
Column 8, line 21, for "an" read --a--.
Column 8, line 26, for "timming" read --timing--.

Signed and Sealed this

Thirtieth Day of March, 1993

*Attest:*

STEPHEN G. KUNIN

*Attesting Officer*    *Acting Commissioner of Patents and Trademarks*